(12) United States Patent  
Corominas

(10) Patent No.: US 6,360,920 B1  
(45) Date of Patent: Mar. 26, 2002

(54) VOLUMETRIC DOSER APPARATUS FOR PASTY MATERIAL

(75) Inventor: Narciso Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 0 days.

(21) Appl. No.: 09/701,957

(22) PCT Filed: Jun. 3, 1999

(86) PCT No.: PCT/ES99/00163

§ 371 Date: Feb. 26, 2001

§ 102(e) Date: Feb. 26, 2001

(87) PCT Pub. No.: WO99/64296

PCT Pub. Date: Dec. 16, 1999

(30) Foreign Application Priority Data

Jun. 5, 1998 (ES) ................................. 9801189

(51) Int. Cl.$^7$ .................................................. G01F 11/00

(52) U.S. Cl. .................. 222/262; 222/278; 222/309; 222/380; 222/452

(58) Field of Search .......................... 222/262, 278, 222/309, 380, 386, 504, 425, 389, 452, 434

(56) References Cited

U.S. PATENT DOCUMENTS

| | | | | |
|---|---|---|---|---|
| 1,975,311 A | * | 10/1934 | Creveling | 222/262 |
| 4,801,097 A | * | 1/1989 | Fitch, Jr. | 222/262 |
| 5,014,882 A | * | 5/1991 | Dennis et al. | 222/402.1 |
| 5,310,095 A | * | 5/1994 | Stern et al. | 222/402.1 |
| 5,685,462 A | * | 11/1997 | Barry | 222/262 |

FOREIGN PATENT DOCUMENTS

| | | |
|---|---|---|
| FR | 1503994 | 2/1968 |
| GB | 1040190 | 8/1966 |
| WO | WO90/14578 | 11/1990 |

* cited by examiner

*Primary Examiner*—Philippe Derakshani  
(74) *Attorney, Agent, or Firm*—David L. Garrison; Garrison & Assoc. PS

(57) ABSTRACT

The apparatus is comprised of a dosing chamber which is internally provided with a piston displaceable freely by means of pasty material introduced through a first extremity of said chamber from a first position to a second position, the piston being then actuated by means of a pressure fluid introduced through a second extremity to return to said first position, thereby displacing a volume being ejected through the extremity which is associated by sealed closing means to an opening of a housing wherein is housed a valve body with means to move the body inside the housing thereby communicating an inlet with said chamber, and alternatingly, communicating said chamber with an outlet conduit having emptying piston.

15 Claims, 2 Drawing Sheets

VOLUMETRIC DOSER APPARATUS FOR PASTY MATERIAL

FIELD OF THE INVENTION

This invention relates to a volumetric dosing apparatus for pasty material, namely for chopped meat and the like, of the type comprising an adjustable dosing chamber, having a known capacity, which can be automatically and cyclically filled and emptied to form portions having an identical volume.

BACKGROUND OF THE INVENTION

In the state of the art different apparatuses of this type are known, such as Patent WO 9014578 in which a machine is disclosed which includes a dosing chamber with an inlet and outlet at one of its ends. Said dosing chamber is provided in its interior with a distributor to alternatively communicate said chamber with said inlet and with said outlet and a plunger which can be freely moved by the effect of the pressure exerted by a pasty material introduced in the dosing chamber by a feeder, a pump or the like, through said inlet and said distributor in inlet position. Said plunger free run goes from a first position to a second position which is predetermined by means of an accurately adjustable stop using a worm system which delimits the volume to be dosed. Thereafter, said plunger is driven in the opposite direction by means of compressed air being forced to come back to said first position, moving the dosed volume of pasty material through said distributor in position of communication with said outlet from which it can be collected in a container or become a sausage. Said apparatus has pneumatic means available which raises the whole dosing chamber in order to allow the access of the alternating distributor for its withdrawal, periodical cleaning and/or inspection.

With this arrangement a very good volumetric dosing of the pasty material is achieved but, however, it has the drawback that the whole work of withdrawing the product must be carried out by the plunger of the dosing chamber. When a significantly long outlet duct is required, as in the case stuffing, important friction forces appear along the outlet duct which require an important stress from said plunger, in addition to the fact that as it is relatively far from the outlet mouth, more than one plunger stroke accumulate in said outlet duct, the dosed volume thus losing accurateness. On the other hand, when the machine stops there is always a portion of product which remains within the outlet duct which is very hard to eliminate, making difficult the work of cleaning this part of the apparatus and meaning a possible deficit of the product sanitary quality. In addition, the system for having access to the alternating distributor by raising very large pieces and supporting them in raised position shows several drawbacks, first relatively powerful fluid mechanical means are required for carrying out said operation; and second, any failure in these fluid mechanical means while having access to the distributor can provoke the descent of the supported pieces, which directly involves a risk of an accident for the manipulating worker.

SHORT DESCRIPTION OF THE INVENTION

Therefore, an object of this invention is to provide with a volumetric dosing apparatus of this type having means independent from the plunger of the dosing chamber to cooperate in the withdrawal of the product, namely useful for works such as packing and stuffing.

Another object of the invention is to provide with an apparatus of the type referred to capable to fully empty the contents of the outlet duct at each cycle.

Another object of the invention is to provide an apparatus of the type referred to with means of access to the alternating distributor, simple, easy to handle and safe for the worker.

Last, another object of the invention, is to provide with an apparatus of this type having a tubular fitting, interchangeable with other ones having different lengths, which constitutes an external extension of the outlet duct, useful for works such as stuffing, which can be completely emptied, together with this later, at each cycle.

These objects are achieved with an apparatus according to this invention by arranging a piston within the outlet duct capable to move on a run from a first position, prior to the opening of the communication of the distributor in outlet position with said outlet duct, up to a second position at the end of said outlet duct or of an accessory pipe which extends it.

To allow the access to the alternating distributor, it has been arranged within an independent housing of the compression chamber and there exists an hinge-joint between them so that by simply releasing fastening means and tilting by hand the dosing chamber said distributor becomes easily accessible, while the chamber remains idle in an open position.

To facilitate the removal of the pasty material from the interior of the dosing chamber through the alternating distributor, avoiding bends in the ducts and to eliminate hardly accessible corners, the outlet duct has been arranged in a secant position with the housing of the valve body of said distributor so that a passageway opening is formed between them by said secant interference. On the cylindric wall of a valve body which can rotate within said housing, a groove has been arranged according to a secant interference which can coincide with said secant interference of the outlet duct with the housing of the valve body, to allow the passage of said piston within the outlet duct while said valve body is in a position in which the inlet duct communicates with the chamber for stuffing.

These and other characteristics of an apparatus according to the invention, as well as its operation, will result clearer from the detailed description thereof with reference to the drawings appended which are only illustrative of a possible embodiment of this invention, and are not to be purported as limitative. In the drawings appended:

SHORT DESCRIPTION OF THE DRAWINGS

DETAILED DESCRIPTION OF THE INVENTION

Figure 1:
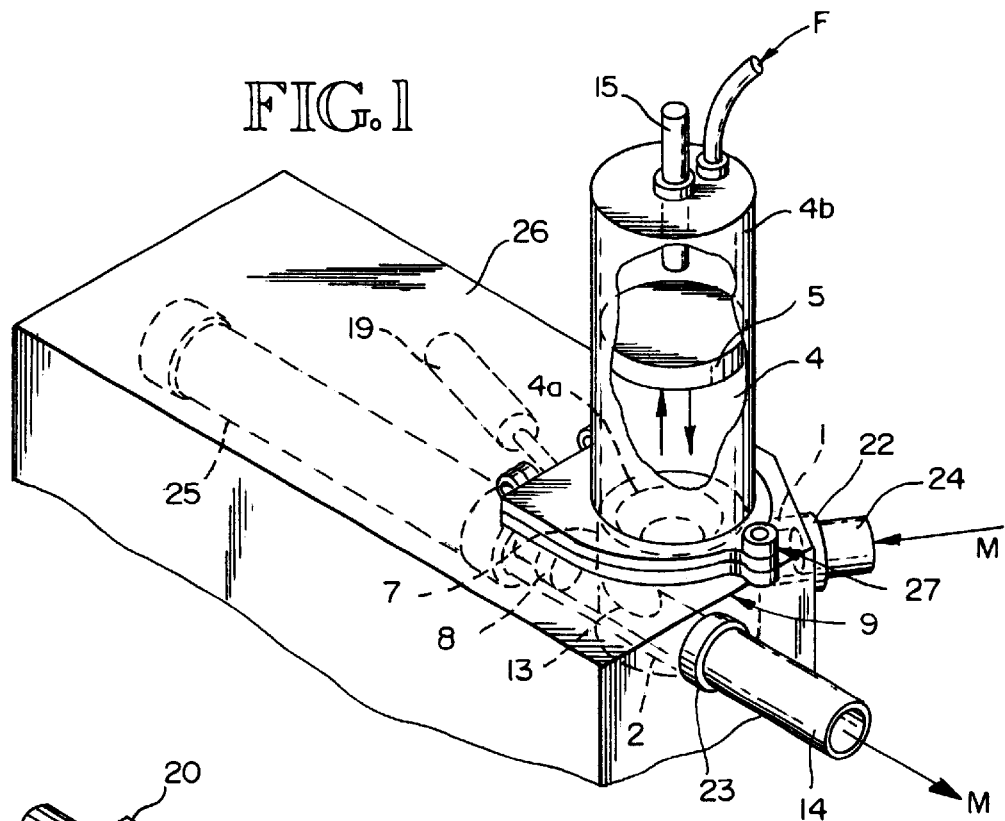
FIG. 1 is a schematic view in perspective illustrating the main elements of a volumetric dosing apparatus for pasty material according to the invention.
Figure 1A:
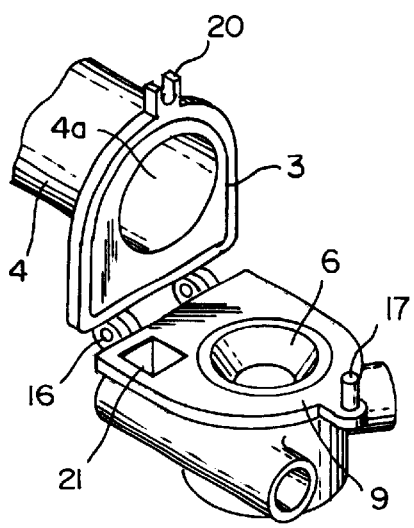
FIG. 1a is a view in perspective of a detail of FIG. 1 showing the dosing chamber folded back to provide access to different elements, for their withdrawal and/or cleaning.

Referring first to FIGS. 1 and 1a, a volumetric dosing apparatus according to the invention can be seen which includes a block 9, which defines a housing 6 for a valve body 7, said block 9 integrates inlet 1 and outlet 2 ducts communicated with said housings 6 and a hinge-joint 16 for a base plate 18 joined to a first end 4a of a dosing chamber 4, said plate 18 being provided with appendages 20 for cooperating with stems 17 to lock by means of fastening means 27 said chamber 4 in a working position, by pressing a sealing elastic joint 3 between said base plate 18 of the chamber 4 and said block 9.

A fluid dynamic cylinder 19 has been arranged to move said valve body 7 within said housing 6 so that: in a first position 7A (see also FIGS. 3 to 6) said inlet duct 1 remains communicated with said dosing chamber 4 through it and successively and alternatively, in a second position 7B said dosing chamber 4 remains communicated with said outlet duct 2.

The dosing chamber 4 is provided in its interior with a plunger 5 without stem. Said plunger 5 can be freely moved by the pressure exerted by a pasty material M, introduced in said inlet duct 1, through said valve body 7 at its first position 7A. The run of the plunger 5 within the dosing chamber 4 goes from a first position 5A (see also FIGS. 3 to 6) up to a second position 5B, predetermined according to the volume to be dosed by means of a stop 15 situated at a second end 4b of the chamber 4, said stop 15 being adjustable from outside by means of a worm. From said second position 5B, said plunger 5 is driven, in opposite direction, by means of a fluid under pressure F introduced from said second end 4b, to come back to said first position 5A moving the dosed volume of pasty material M through said valve body 7 at its second position 7B, to expel it to said outlet duct 2. So that, the dose of pasty material M so obtained corresponds to the internal volume of the chamber 4 delimited by said first 5A and second 5B positions of the plunger 5.

Associated to the outlet duct 2 there is an emptying piston 8 and means for its moving within said outlet duct 2 from a first position 8A (see also FIGS. 3 to 6), prior to an outlet opening 6c of said housing 6 up to a second position 8B, at the end of said outlet duct 2, for fully emptying it. Optionally, the outlet duct 2 is extended by means of a tubular element 14, interchangeable by other ones having different lengths, said piston 8 can extend its run moving within said tubular element 14 and to be located, in said second position 8B, at the end of it for its full emptying. This tubular element 14 is specially useful to carry out tasks such as stuffing from the pasty material M.

Said block 9 includes a hole 21 which directly communicates with the end of the outlet duct 2 adjacent to the first position 8A of the piston 8 for the withdrawal and assembly of the plunger thereof, the mouth of said hole 21 remaining within the perimeter of the elastic joint 3 when the chamber 4 is closed in working position.

The volumetric dosing apparatus of this invention includes a housing 25 which integrates: said block 9; a sleeve 22 for fastening and connecting the inlet duct 1 to an external feeder 24; a sleeve 23 for fastening and connecting the outlet duct 2 to said tubular element 14 extending it; a fluid dynamic cylinder 25 for driving said piston 8 emptying the outlet duct 2; said cylinder 19 driving the valve body 7; as well as electric circuitry and fluid dynamic elements and related elements for controlling them (not shown).

In FIG. 1a said apparatus is shown with the dosing chamber folded back leaving accessible the housing 6 of the valve body 7, the end 4a of the dosing chamber 4 with the plunger 5 within it, and the hole 21 for the access to the piston plunger 8 within the outlet duct 2.

Figure 2:
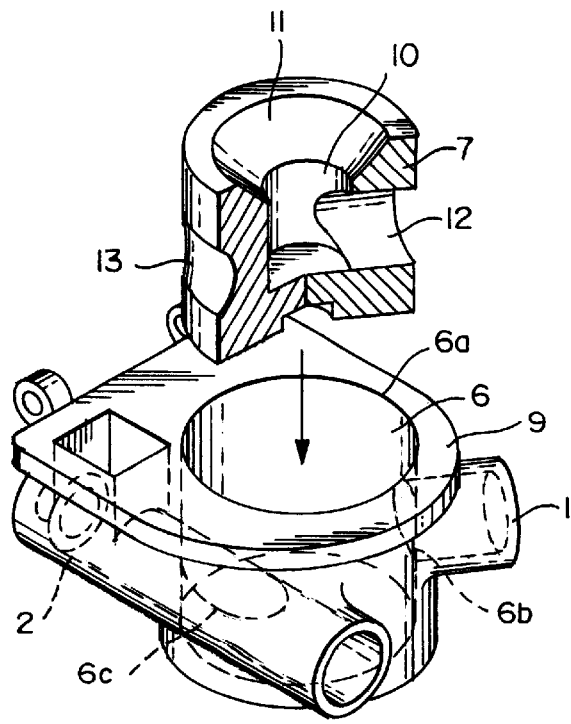
FIG. 2 is an exploded view in perspective of an alternating distributor of an apparatus according to the invention, showing its elements and the main characteristics thereof.
Figure 3:
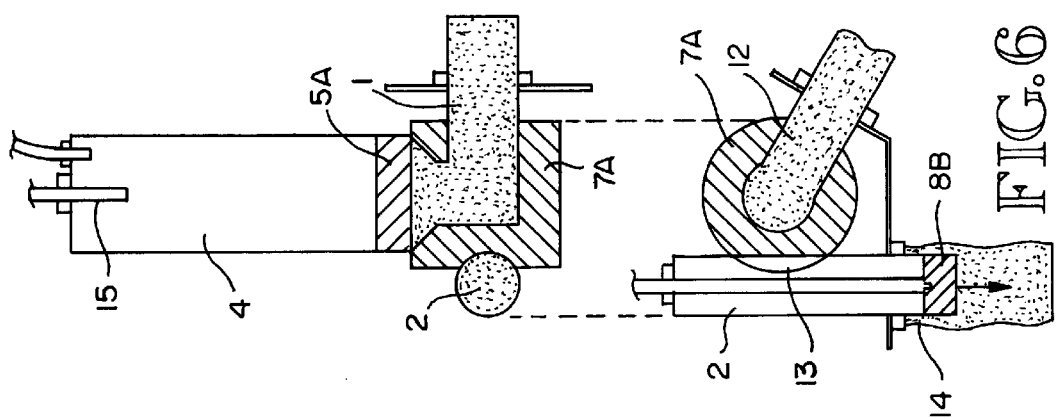
FIGS. 3 to 6 are schematic diagrams, each including an elevation view and a planview illustrating the different positions adopted by some of the elements of an apparatus according to the invention in four different steps of its operation.
Figure 4:
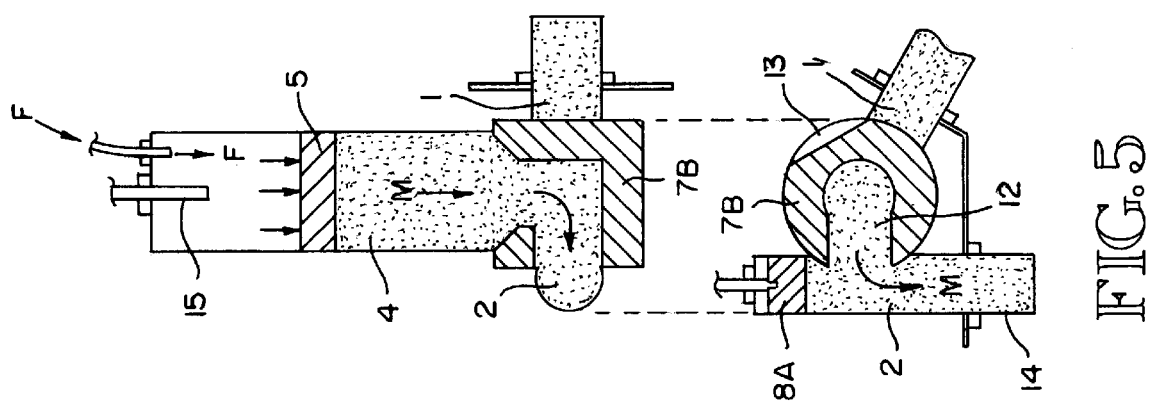
Figure 5:
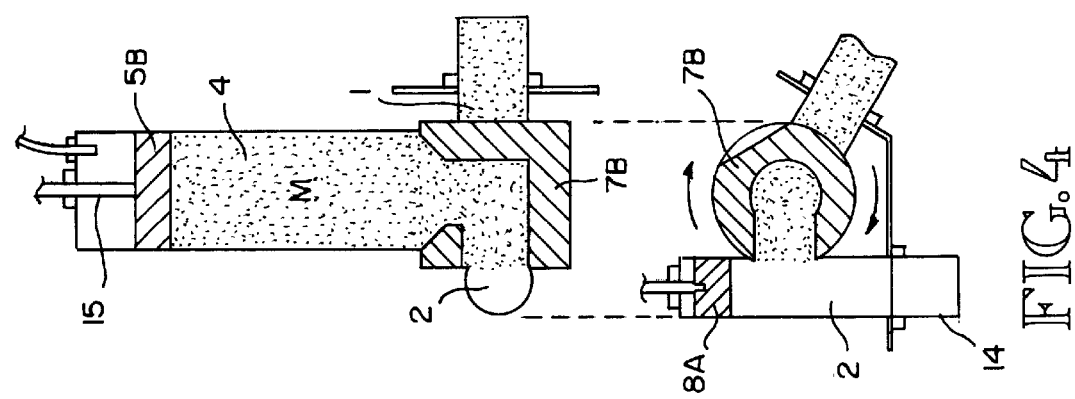
Figure 6:
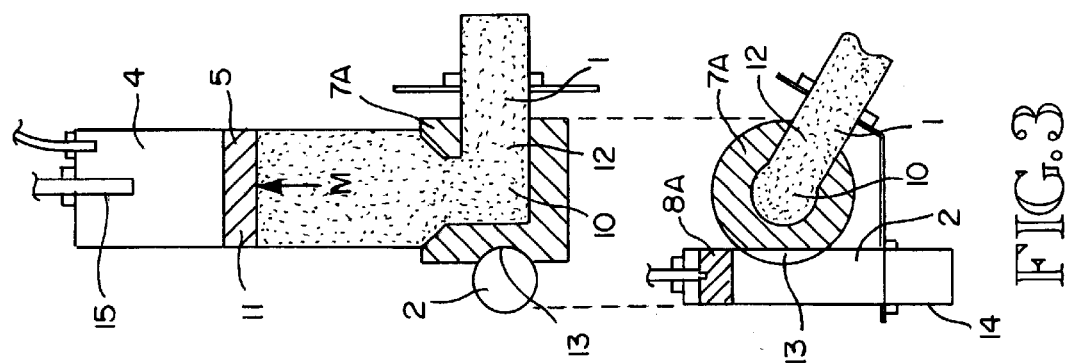

With reference to FIG. 2, it can be seen that, at block 9, the position of said outlet duct 2 is secant to said housing 6, being formed between them a secant intersection constituting a communication opening 6c. On its side, said valve body 7 is cylindric and is provided with a cavity 10 outwardly open by means of a flaring 11 at one of its bases and by means of a cross opening 12, including in addition a groove 17, corresponding to a secant intersection, at an area of its periphery angularly spaced from the mouth of said cross opening 12. Said valve body 7 can alternatively rotate within its housing 6, with the flaring 11 continuously facing the inlet of the dosing chamber 4, between said first position 7A, in which the cross opening 12 is facing the inlet duct 1 and the groove 12 coincides with the secant intersection 6c of the outlet duct 2 allowing the piston 8 run and said second position 7B in which the cross opening 12 is facing said secant intersection of communication 6c with the outlet duct 2 and the cylindric wall of said valve body 7 is choking the inlet duct 1 mouth.

In FIGS. 3 to 6 a sequence is shown of four different steps of the apparatus operation, in which different combinations between the positions of the plunger 5, the valve body 7 and the piston 8 are shown. In fact, it can be seen that in a first step (FIG. 3) the introduction of the pasty material M within the chamber 4 is started through the inlet duct 1 and the valve body 7 at its position 7A, while the piston 8 remains at its first position 8A. In this first step the plunger 5 within the chamber 4 runs under the pressure exerted by the pasty material M, pushed by an external feeder. When the plunger 5 reaches its second position 5B (FIG. 4) delimited by the adjustable stop 15, the entrance of pasty material is stopped and the body valve 7 is rotated to adopt its second position 7B. At the third step (FIG. 5) the plunger 5 is pushed by the fluid F under pressure introduced by said second end 4a of the chamber 4 to move it in the opposite direction until it comes back to its first position 5A pushing the dosed volume of pasty material M to deposit it in the outlet duct 2. Thereafter, at a fourth step (FIG. 6) when the whole dosed volume is within the outlet duct 2, the valve body 7 comes back to its first position 7A and thereafter the piston 8 runs up to its second position 8B, at the end of said outlet duct 2, or if fit, of the tubular element 14, fully expelling the pasty material M for example for stuffing it. Then, the piston 8 comes back to its first position 8A (see again FIG. 3) the apparatus remaining ready for starting a new cycle.

It is obvious that, because of the special configuration of the valve body 7, some of above described steps can be carried out simultaneously so that the piston 8 expels the portion of pasty material M from the outlet duct 2 at same time that the pasty material M is introduced through the inlet duct 1 to fill the dosing chamber 4 moving the plunger 5 up to the stop 15.

What is claimed is:

1. Volumetric dosing apparatus for pasty material, of the type which includes a dosing chamber having an axial development, provided in its interior with a plunger which can be freely moved by a pasty material introduced from a first end of said chamber from a first position up to a second position and to be thereafter driven in the opposite direction by means of fluid under pressure introduced from a second end of the chamber, to come back to said first position moving a dosed volume of pasty material delimited between first and second positions to expel it through said first end, said chamber being associated at its first end to a first opening of a housing which houses a valve body said housing having a second opening connected to an inlet duct of pasty material and a third opening connected to an outlet duct of pasty material, driving means being provided for moving said valve body within said housing so that said second opening remains communicated with said dosing chamber while said dosing chamber communicates successively and alternately with said third opening through the valve body, characterized in that said chamber is hinge-joined with respect to the housing, and it can tilt to provide an access to the housing, valve body and dosing chamber for their cleaning and/or withdrawal.

2. Volumetric dosing apparatus, according to claim 1, characterized in that it further includes, associated to the outlet duct, an emptying piston and means for moving it within said outlet duct from a first position, prior to the outlet opening from said housing, up to a second position at the end of said outlet duct for fully emptying it.

3. Volumetric dosing apparatus, according to claim 2, characterized in that the position of said outlet duct is secant to said housing, said outlet opening being constituted by a secant intersection formed therebetween.

4. Volumetric dosing apparatus, according to claim 3, characterized in that said valve body is cylindrical and is provided with a cavity outwardly open by means of a flaring at one of its bases and by means of a transverse opening at its cylindrical surface, so that said valve body can alternately rotate within its housing with the flaring continuously facing the inlet of dosing chamber between a first position, in which the transverse opening is facing the inlet duct and the groove is coinciding with the secant intersection completing the outlet duct, and a second position in which the transverse opening is facing said secant intersection communicating with the outlet duct with the piston at its first position and the cylindrical wall of said valve body is shutting the mouth of inlet duct.

5. Volumetric dosing apparatus, according to claim 4, characterized in that the angular distance between the groove and the transverse opening is of about 150° and is calculated in order that when said transverse opening communicates with the outlet duct said groove of the valve body does not reach the inlet duct.

6. Volumetric dosing apparatus, according to claim 2, characterized in that said outlet duct is extended by means of a tubular element interchangeable by others having different lengths, said emptying piston being able to extend its run moving within said tubular element and to be located, in said second position, at the end thereof for its full emptying.

7. Volumetric dosing apparatus, according to claim 1, characterized in that the second position of the plunger within the dosing chamber is determined by a stop adjustable by means of a worm from outside.

8. Volumetric dosing apparatus, according to claim 2, characterized in that a block defines the housing and integrates said inlet and outlet ducts communicating with said housing, said block being linked to a base plate attached to said dosing chamber by an articulation such as a hinge, said base plate being provided with appendages and/or openings that co-operates with stems and fastening means to lock said chamber in a working position in which a sealing elastic joint arranged between said base plate and said block is pressed.

9. Volumetric dosing apparatus, according the claim 8, characterized in that said block includes a hole which communicates directly with that end of the outlet duct adjacent to the first position of piston for the withdrawal and assembly of the plunger thereof, the mouth of said hole remaining within the perimeter of the elastic joint when the chamber is locked in said working position.

10. Volumetric dosing apparatus, according the claim 9, characterized in that it includes a housing which integrates said block; a sleeve for fastening and connecting the outlet duct with a feeder; a sleeve for fastening and connecting the outlet duct with said tubular element of extension thereof; a fluid dynamic cylinder for driving said piston emptying the outlet duct; a cylinder for driving the valve body; as well as electric circuitry and fluid dynamic elements and corresponding control elements thereof.

11. Volumetric dosing apparatus, according to claim 3, characterized in that a block defines the housing and integrates said inlet and outlet ducts communicating with said housing, said block being linked to a base plate attached to said dosing chamber by an articulation such as a hinge, said base plate being provided with appendages and/or openings that co-operates with stems and fastening means to lock said chamber in a working position in which a sealing elastic joint arranged between said base plate and said block is pressed.

12. Volumetric dosing apparatus, according to claim 4, characterized in that a block defines the housing and integrates said inlet and outlet ducts communicating with said housing, said block being linked to a base plate attached to said dosing chamber by an articulation such as a hinge, said base plate being provided with appendages and/or openings that co-operates with stems and fastening means to lock said chamber in a working position in which a sealing elastic joint arranged between said base plate and said block is pressed.

13. Volumetric dosing apparatus, according to claim 5, characterized in that a block defines the housing and integrates said inlet and outlet ducts communicating with said housing, said block being linked to a base plate attached to said dosing chamber by an articulation such as a hinge, said base plate being provided with appendages and/or openings that co-operates with stems and fastening means to lock said chamber in a working position in which a sealing elastic joint arranged between said base plate and said block is pressed.

14. Volumetric dosing apparatus, according to claim 6, characterized in that a block defines the housing and integrates said inlet and outlet ducts communicating with said housing, said block being linked to a base plate attached to said dosing chamber by an articulation such as a hinge, said base plate being provided with appendages and/or openings that co-operates with stems and fastening means to lock said chamber in a working position in which a sealing elastic joint arranged between said base plate and said block is pressed.

15. Volumetric dosing apparatus, according to claim 7, characterized in that a block defines the housing and integrates said inlet and outlet ducts communicating with said housing, said block being linked to a base plate attached to said dosing chamber by an articulation such as a hinge, said base plate being provided with appendages and/or openings that co-operates with stems and fastening means to lock said chamber in a working position in which a sealing elastic joint arranged between said base plate and said block is pressed.

* * * * *